United States Patent
Chen

(10) Patent No.: US 11,629,745 B2
(45) Date of Patent: Apr. 18, 2023

(54) SCREW

(71) Applicant: VERTEX PRECISION INDUSTRIAL CORP., Kaohsiung (TW)

(72) Inventor: Ching-Cheng Chen, Kaohsiung (TW)

(73) Assignee: VERTEX PRECISION INDUSTRIAL CORP., Kaohsiung (TW)

( * ) Notice: Subject to any disclaimer, the term of this patent is extended or adjusted under 35 U.S.C. 154(b) by 226 days.

(21) Appl. No.: 16/951,143

(22) Filed: Nov. 18, 2020

(65) Prior Publication Data

US 2021/0277927 A1    Sep. 9, 2021

(30) Foreign Application Priority Data

Mar. 5, 2020   (TW) ................................ 109202463

(51) Int. Cl.
*F16B 35/04*   (2006.01)
(52) U.S. Cl.
CPC ................................ *F16B 35/044* (2013.01)
(58) Field of Classification Search
CPC ....... F16B 25/10; F16B 25/103; F16B 35/044
USPC ............................................... 411/387.2, 402
See application file for complete search history.

(56) References Cited

U.S. PATENT DOCUMENTS

| | | | | |
|---|---|---|---|---|
| 3,827,331 A * | 8/1974 | Muenchinger | ...... | F16B 25/0057 411/416 |
| 4,781,506 A * | 11/1988 | Roberts | ......... | F16B 25/103 408/230 |
| 5,015,134 A * | 5/1991 | Gotoh | ......... | F16B 25/0015 411/413 |
| 5,205,694 A * | 4/1993 | Nagoshi | ......... | F16B 23/0023 411/404 |
| 5,827,030 A * | 10/1998 | Dicke | ......... | F16B 25/0052 411/386 |
| 5,882,161 A * | 3/1999 | Birkelbach | ......... | F16B 25/0084 411/386 |
| 5,895,187 A * | 4/1999 | Kuo-Tai | ......... | F16B 25/0068 411/311 |
| 5,964,560 A * | 10/1999 | Henriksen | ......... | F16B 25/0031 411/404 |
| 6,672,812 B1 * | 1/2004 | Lin | ......... | F16B 25/0078 411/387.2 |
| 8,348,572 B2 * | 1/2013 | Friederich | ......... | F16B 25/106 411/452 |
| 10,054,147 B2 | 8/2018 | Hubmann | | |
| 2003/0198532 A1 * | 10/2003 | Hsu | ......... | F16B 25/0052 411/311 |

(Continued)

*Primary Examiner* — Gary W Estremsky
(74) *Attorney, Agent, or Firm* — Alan D. Kamrath; Karin L. Williams; Mayer & Williams PC

(57) ABSTRACT

A screw has a screw head and a shank extending downwardly from the screw head. The shank has a threaded segment, a cutting segment, and a tapered segment sequentially arranged downwardly, a thread spirally surrounding an external surface of the shank from the threaded segment to the tapered segment, multiple cutting ribs arranged around the external surface of the shank on the cutting segment of the shank, and multiple chip recesses formed between the cutting ribs. Each of the cutting ribs has a rounded crest to enlarge a drill hole and to reduce a resistance formed between the cutting ribs and the workpiece during drilling. The screw can be easily screwed into the workpiece with less driving force.

9 Claims, 7 Drawing Sheets

(56) References Cited

U.S. PATENT DOCUMENTS

| | | | |
|---|---|---|---|
| 2006/0153662 A1* | 7/2006 | Chen | F16B 25/103 411/387.1 |
| 2006/0228189 A1* | 10/2006 | Lin | B25B 15/005 411/402 |
| 2017/0108026 A1 | 4/2017 | Yang | |

* cited by examiner

SCREW

BACKGROUND OF THE INVENTION

1. Field of the Invention

The present invention relates to a screw, and more particularly to a screw that is screwed into multiple wooden workpieces to fasten the wooden workpieces.

2. Description of Related Art

A conventional wood screw comprises a screw head and a shank extending downwardly from the screw head. The shank has a tip formed on a bottom thereof, a threaded portion spirally surrounding an external surface of the shank and extending downwardly to the tip of the shank, multiple V-shaped cutting ribs arranged around the external surface of the shank at spaced intervals and longitudinally extending on a segment of the shank surrounded by the threaded portion, and multiple chip recesses formed between the cutting ribs. Each chip recess is formed between two adjacent chip recesses.

To screw the conventional wood screw into a wooden workpiece, the tip of the conventional wood screw abuts on a surface of the wooden workpiece, a tool is engaged with the screw head and is driven to rotate the conventional wood screw. The threaded portion and the cutting ribs of the conventional wood screw bore a hole in the surface of the wooden workpiece while rotating. During drilling into the wooden workpiece, the conventional wood screw will drill into the wooden workpiece downwardly by a guidance of the threaded portion, the cutting ribs will provide an effect to enlarge the hole, and chips will be filled in the chip recesses.

However, the V-shaped cutting ribs are arranged around the shank at the segment surrounded by the threaded portion to decrease a relative thread depth of the threaded portion. The cutting ribs having sharp edges will increase a rotation resistance during drilling. Accordingly, the conventional wood screw requires a larger driving force to be screwed into the wooden workpiece.

To overcome the shortcomings, the present invention provides a screw to mitigate or obviate the aforementioned problems.

SUMMARY OF THE INVENTION

The main objective of the present invention is to provide a screw that can be easily screwed into workpieces with less driving force.

The screw in accordance with the present invention comprises a screw head and a shank. The screw head has an engaging recess recessed in a top surface of the screw head. The shank extends downwardly from a bottom of the screw head and has a central axis, an imaginary plane being perpendicular to the central axis, a threaded segment, a cutting segment, and a tapered segment sequentially arranged downwardly, a thread, multiple cutting ribs, and multiple chip recesses. The thread spirally surrounds an external surface of the shank, extends downwardly from the threaded segment to the tapered segment of the shank, and has a first lead angle formed between the thread and the imaginary plane and being an acute angle. The cutting ribs are arranged around the external surface of the shank on the cutting segment of the shank. Each of the cutting ribs has a rounded crest and a second lead angle formed between the cutting rib and the imaginary plane and being an acute angle. The second lead angle is larger than the first lead angle. The chip recesses are formed between the cutting ribs, and each of the chip recesses is formed between two of the cutting ribs being adjacent to each other.

Other objects, advantages, and novel features of the invention will become more apparent from the following detailed description when taken in conjunction with the accompanying drawings.

DETAILED DESCRIPTION OF PREFERRED EMBODIMENTS

Figure 1:
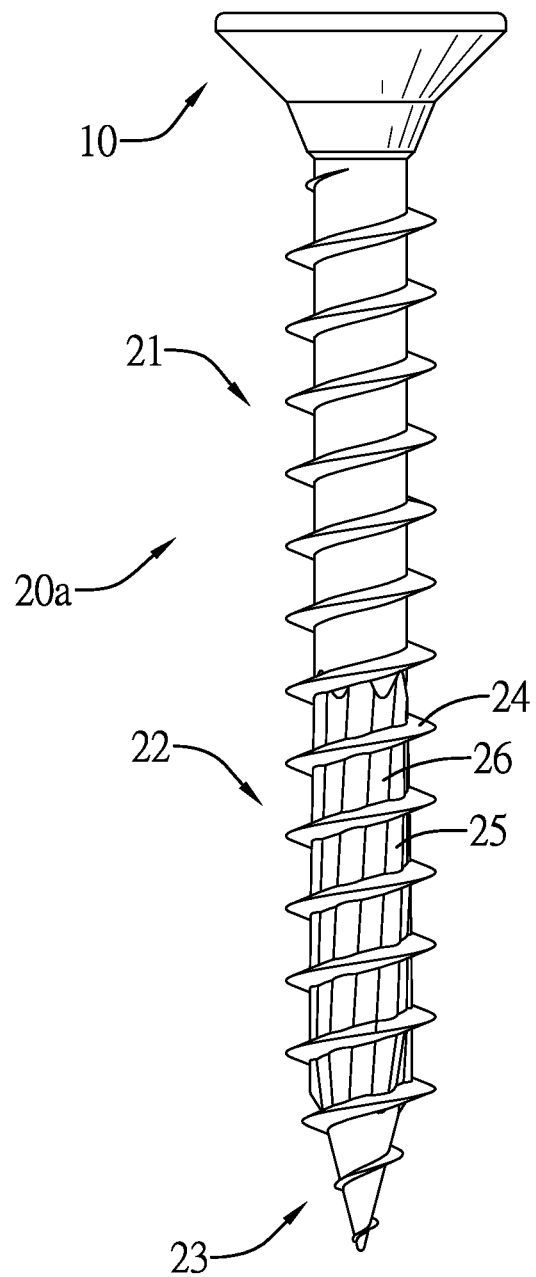
FIG. 1 is a side view of a first embodiment of a screw in accordance with the present invention.
Figure 2:
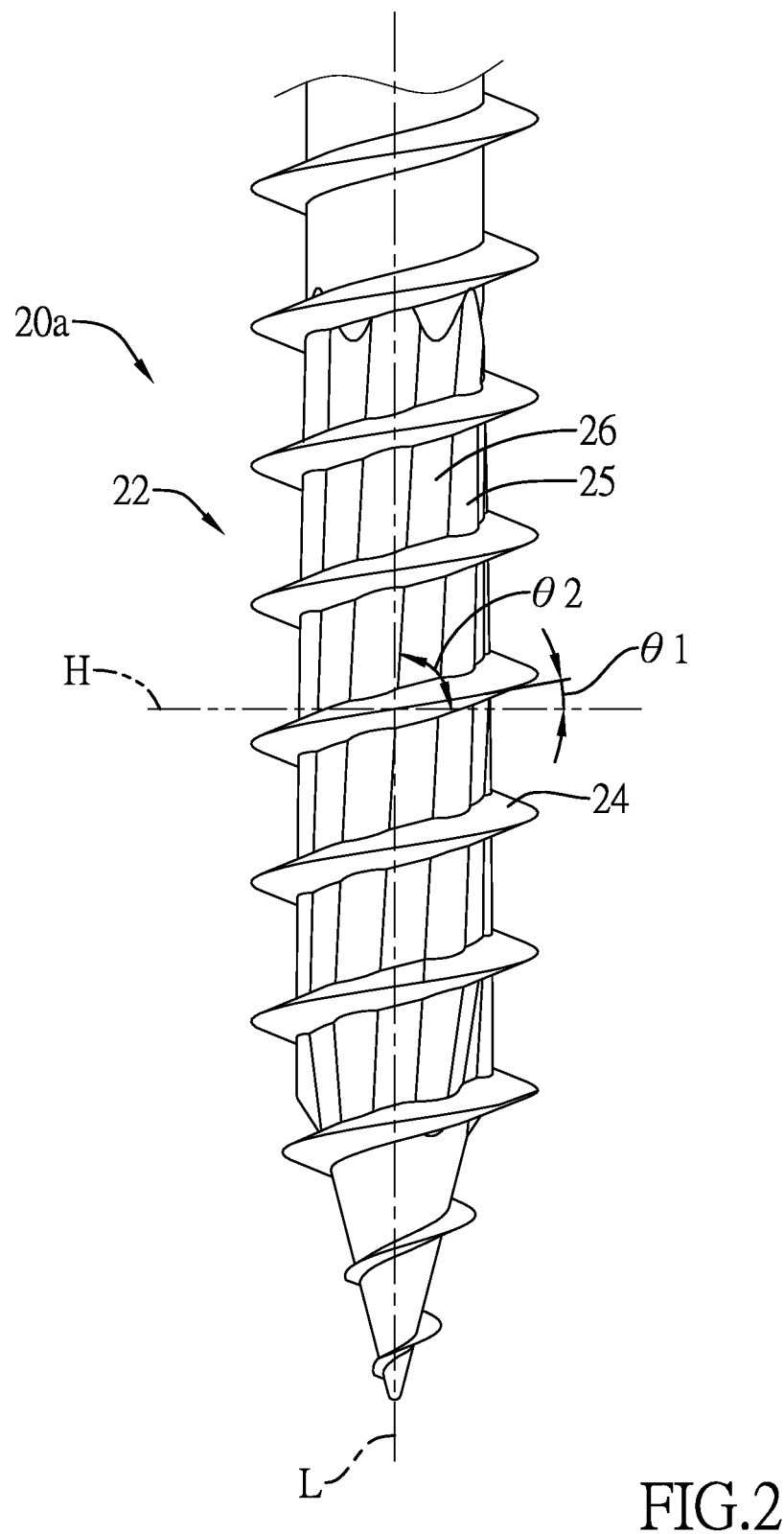
FIG. 2 is an enlarged side view of the screw in FIG. 1.

With reference to FIGS. 1 and 2, a first embodiment of a screw in accordance with the present invention has a screw head 10 and a shank 20a.

Figure 4:
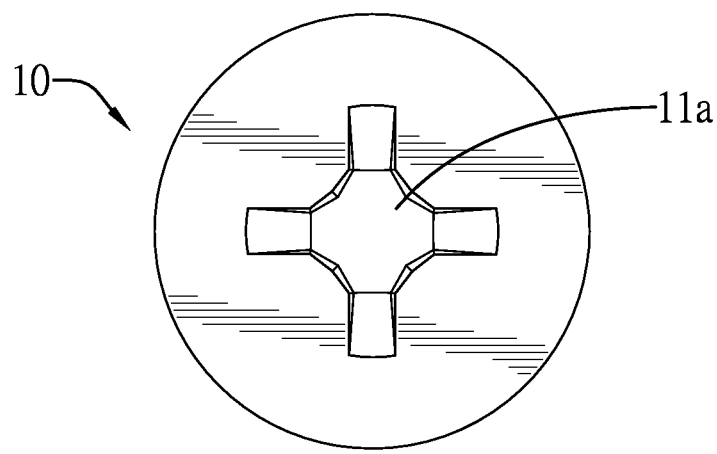
FIG. 4 is a top view of the screw in FIG. 1 showing that an engaging recess is a cross recess.
Figure 5:
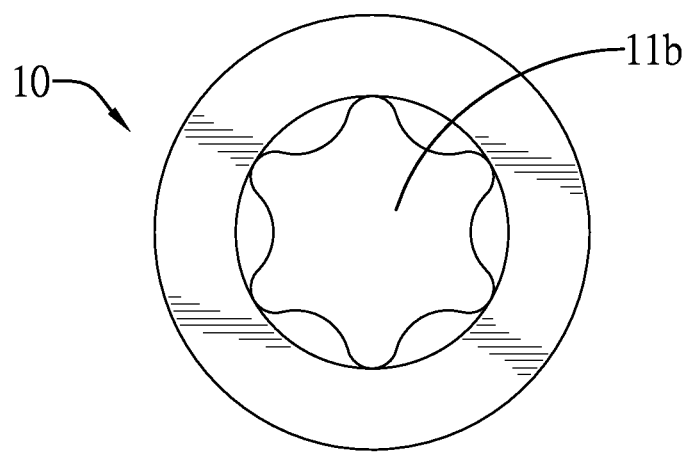
FIG. 5 is a top view of the screw in FIG. 1 showing that an engaging recess is a hexalobular recess.
Figure 6:
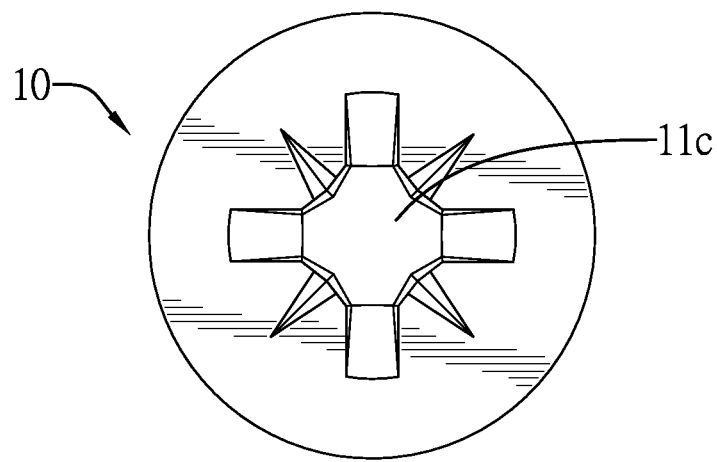
FIG. 6 is a top view of the screw in FIG. 1 showing an engaging recess having a main cross recess and four radial indentations.

With reference to FIGS. 1, 4, 5, and 6, the screw head 10 has an engaging recess 11a, 11b, 11c recessed in a top surface of the screw head 10. The engaging recess 11a, 11b, 11c may be a cross recess as shown in FIG. 4, a hexalobular recess as shown in FIG. 5, or a recess having a main cross recess and four radial indentations arranged around the main cross recess as shown in FIG. 6.

With reference to FIGS. 1 and 2, the shank 20a extends downwardly from a bottom of the screw head 10 and has a central axis L and an imaginary plane H being perpendicular to the central axis L. The shank 20a has a threaded segment 21, a cutting segment 22, and a tapered segment 23 sequentially arranged downwardly from a top to a bottom of the shank 20a. The shank 20a has a thread 24 spirally surrounding an external surface of the shank 20a and multiple cutting ribs 25 arranged around the external surface of the shank 20a. The thread 24 extends from the threaded segment 21 to the tapered segment 23 of the shank 20a. The thread 24 has a first lead angle θ1 formed between the thread 24 and the imaginary plane H and being an acute angle. The cutting ribs 25 are arranged around the external surface of the shank 20a on the cutting segment 22 thereof. Each of the cutting ribs 25 extends downwardly from a top end to a bottom end of the cutting segment 22 and has a rounded crest and a second lead angle θ2 formed between the cutting rib 25 and the imaginary plane H and being an acute angle. The second lead angle θ2 is larger than the first lead angle θ1. Multiple chip recesses 26 are formed between the cutting ribs 25. Each of the chip recesses 26 is formed between two of the cutting ribs 25 being adjacent to each other. Each of the chip recesses 26 has a rounded root.

Figure 3:
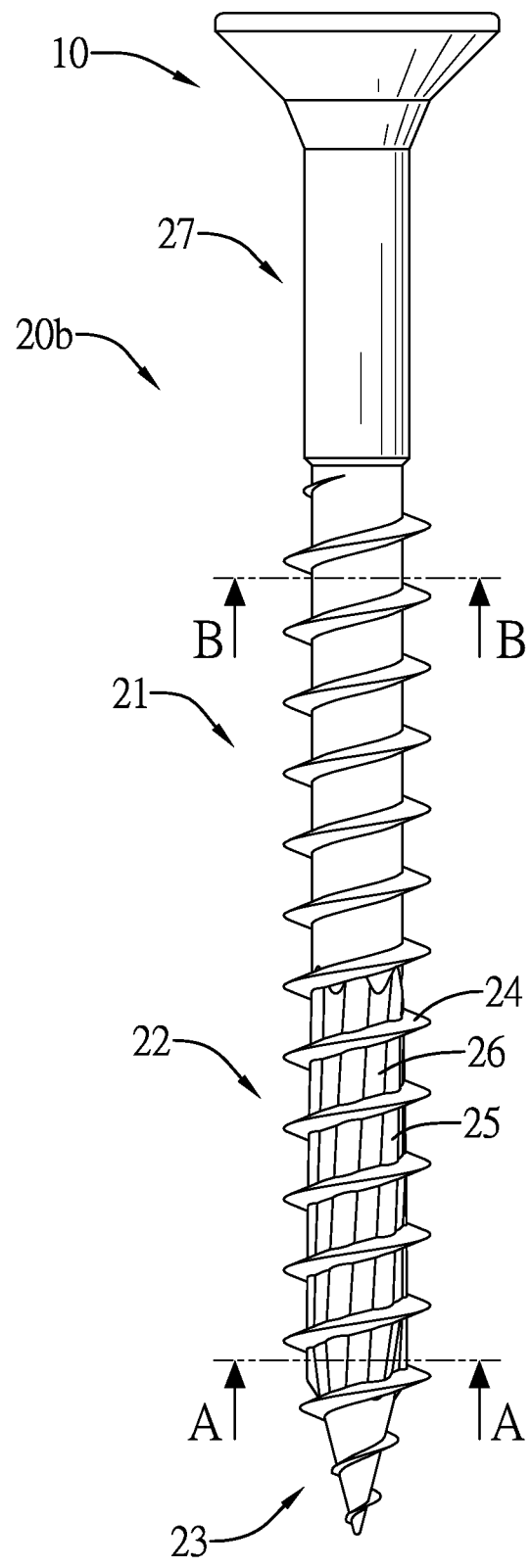
FIG. 3 is a side view of a second embodiment of a screw in accordance with the present invention.

With reference to FIG. 3, in a second embodiment of a screw in accordance with the present invention, the shank 20b further has a non-threaded segment 27. The non-threaded segment 27 is formed between the threaded segment 21 and the screw head 10.

Figure 7:
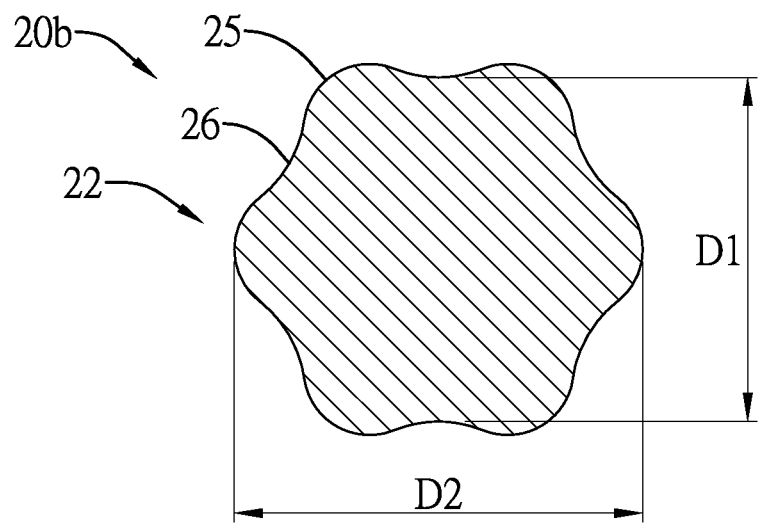
FIG. 7 is a cross sectional bottom view of the screw along a line A-A in FIG. 3.
Figure 8:
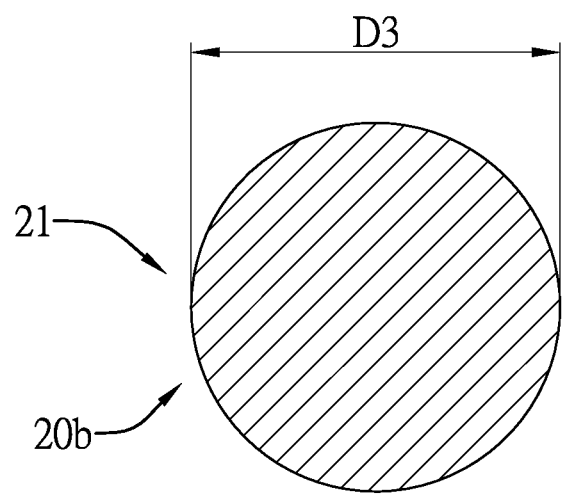
FIG. 8 is a cross sectional bottom view of the screw along a line B-B in FIG. 3.

With reference to FIGS. 3, 7, and 8, the cutting segment 22 has a first diameter D1 being a diameter of an inscribed circle of the rounded roots of the chip recesses 26 and a second diameter D2 being a diameter of a circumcircle of the rounded crests of the cutting ribs 25. The threaded segment 21 has a third diameter D3 being a minor diameter of the threaded segment 21. The first diameter D1 is smaller than the third diameter D3, and the second diameter D2 is larger than the third diameter D3.

Figure 9:
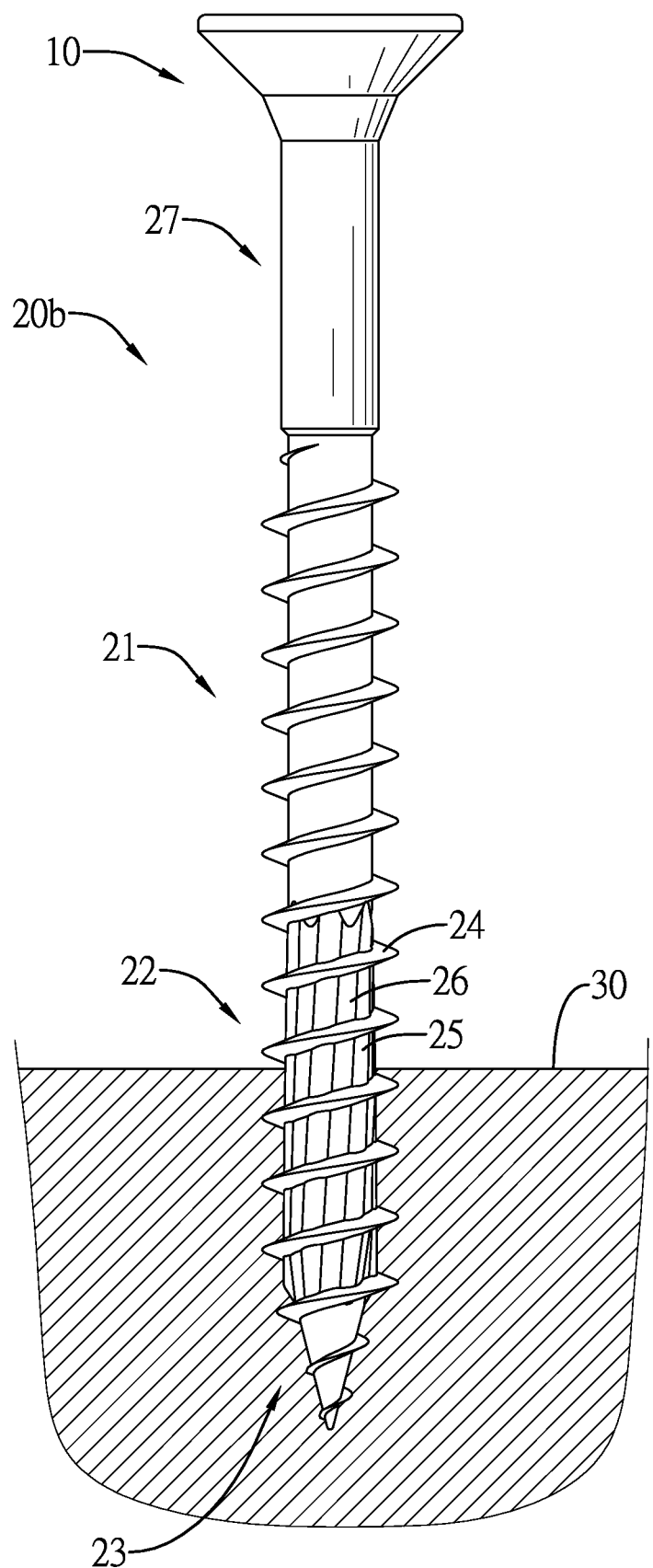
FIGS. 9 and 10 are operational side views of the screw in FIG. 3, showing that the screw is drilling into a workpiece.
Figure 10:
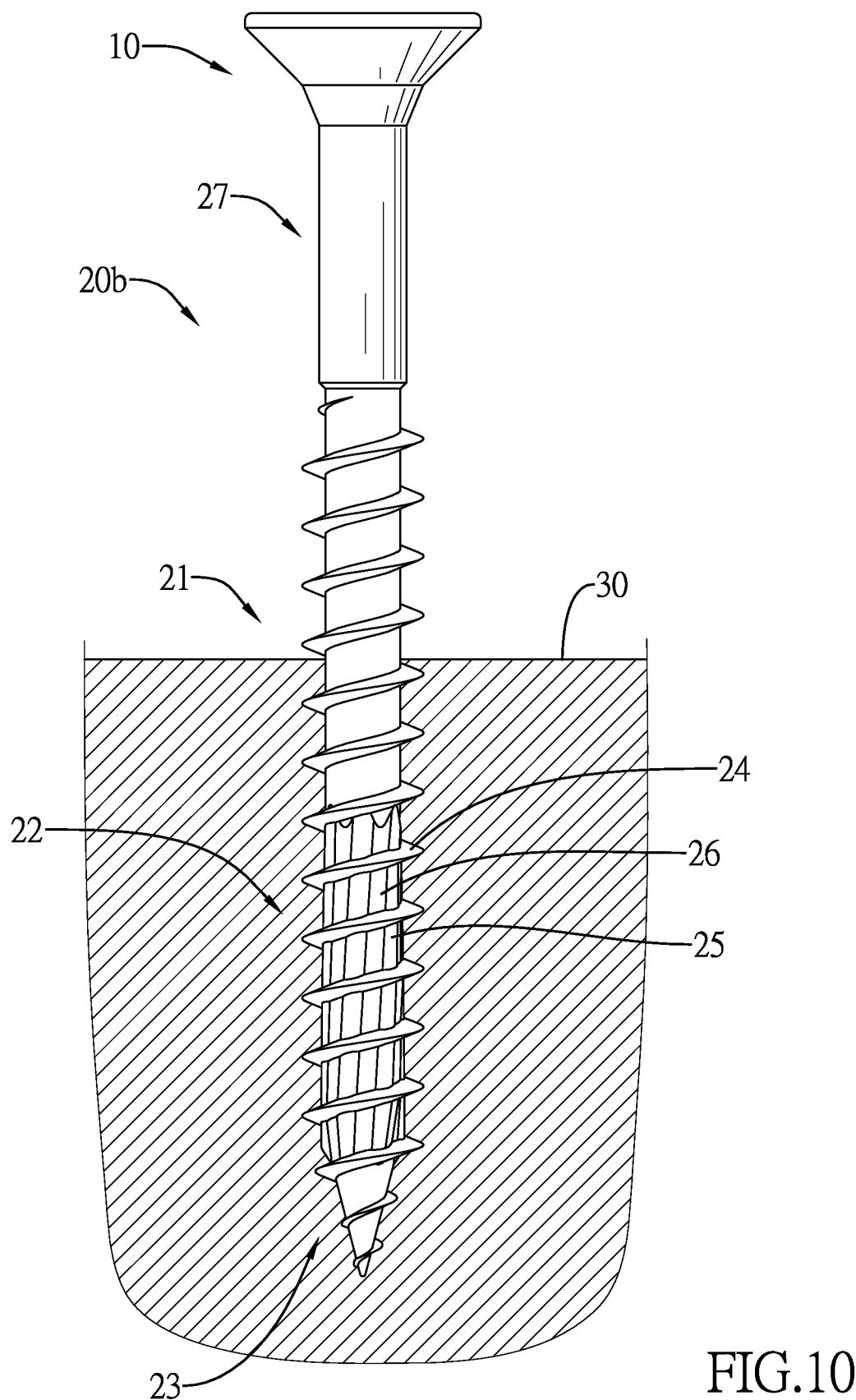

With reference to FIGS. 9 and 10, to screw the screw in accordance with the present invention into a wooden workpiece 30, the tapered segment 23 abuts on the workpiece 30, a tool corresponding to the engaging recess 11a, 11, 11c of the screw as shown in FIGS. 4 to 6 is engaged with the engaging recess 11a, 11b, 11c and is driven to rotate the screw. The screw drills into the workpiece 30 via the thread 24 surrounding the tapered segment 23.

With reference to FIG. 9, after the tapered segment 23 of the screw completely drills into the workpiece 30, the cutting segment 22 of the screw continually drills into the workpiece 30 via the thread 24 surrounding the cutting segment 22. The hole drilled by the screw is enlarged by the cutting ribs 25 formed on the cutting segment 22 at the same time, and wood chips cut from the workpiece 30 by the cutting ribs 25 and the thread 24 are accommodated in the chip recess 26 to reduce a resistance generated by the chips during drilling into the workpiece 30. Because the cutting ribs 25 have rounded crests, a resistance formed between the cutting ribs 25 and the workpiece 30 can be reduced during rotating, a driving force for the screw drilling into the workpiece 30 can be reduced, and the screw can easily drill into the workpiece 30.

With reference to FIGS. 3, 7, and 8, because the first diameter D1 is smaller than the third diameter D3, and the second diameter D2 is larger than the third diameter D3, when the threaded segment 21 drills into the workpiece 30, a groove formed between the thread 24 of the shank 20b can provide a space for accommodating the chips to reduce a resistance generated by the chips during drilling into the workpiece 30. The driving force for drilling into the workpiece 30 will not be obviously increased while the threaded segment 21 is drilling into the workpiece 30. The screw can be easily screwed into workpieces 30 with less driving force.

With such arrangement, the tapered segment 23 can drill a hole into the wooden workpiece 30, and the hole can be enlarged by the cutting ribs 25. Because of the rounded crests of the cutting ribs 25, a resistance formed between the cutting ribs 25 and the workpiece 30 can be reduced during drilling. The chip recesses 26 formed between the cutting ribs 25 can provide spaces for accommodating the chips. The screw can be easily screwed into the workpiece 30 with less driving force.

What is claimed is:

1. A screw, comprising:
   a screw head having an engaging recess recessed in a top surface of the screw head; and
   a shank extending downwardly from a bottom of the screw head and having a central axis;
   an imaginary plane being perpendicular to the central axis;
   a threaded segment, a cutting segment, and a tapered segment sequentially arranged downwardly;
   a thread spirally surrounding an external surface of the shank, extending downwardly from the threaded segment to the tapered segment of the shank, and having a first lead angle formed between the thread and the imaginary plane and being an acute angle;
   multiple cutting ribs arranged around the external surface of the shank on the cutting segment of the shank, each of the cutting ribs having a rounded crest and a second lead angle formed between the cutting rib and the imaginary plane and being an acute angle; and
   multiple chip recesses formed between the cutting ribs, and each of the chip recesses formed between two of the cutting ribs being adjacent to each other;
   wherein the second lead angle is larger than the first lead angle,
   wherein the cutting segment of the shank has a first diameter being a diameter of an inscribed circle of roots of the chip recesses and a second diameter being a diameter of a circumcircle of the rounded crests of the cutting ribs;
   wherein the threaded segment of the shank has a third diameter being a minor diameter of the threaded segment, and wherein the first diameter is smaller than the third diameter and the second diameter is larger than the third diameter.

2. The screw as claimed in claim 1, wherein the shank has a non-threaded segment formed between the screw head and the threaded segment of the shank.

3. The screw as claimed in claim 2, wherein the root of each of the chip recesses is a rounded root.

4. The screw as claimed in claim 2, wherein the engaging recess is a hexalobular recess.

5. The screw as claimed in claim 1, wherein the root of each of the chip recesses is a rounded root.

6. The screw as claimed in claim 1, wherein the engaging recess is a cross recess.

7. The screw as claimed in claim 2, wherein the engaging recess is a cross recess.

8. The screw as claimed in claim 1, wherein the engaging recess is a hexalobular recess.

9. The screw as claimed in claim 1, wherein the engaging recess has a main cross recess and four radial indentations arranged around the main cross recess.

* * * * *